United States Patent
Scheublein, Jr. et al.

[15] 3,656,221
[45] Apr. 18, 1972

[54] METHOD OF ASSEMBLY OF JOINT DEVICES AND APPARATUS THEREFOR

[72] Inventors: William A. Scheublein, Jr., Ballwin; Louis P. Fister, St. Louis, both of Mo.

[73] Assignee: Moog Industries, Inc., St. Louis, Mo.

[22] Filed: Feb. 2, 1970

[21] Appl. No.: 7,514

[52] U.S. Cl..............................29/149.5 B, 29/441, 29/511, 287/87
[51] Int. Cl.................B23p 11/00, B21d 53/00, B21d 39/00
[58] Field of Search..............29/149.5 B, 441, 511, 243.52, 29/149.5 R; 287/87

[56] References Cited

UNITED STATES PATENTS

| | | | |
|---|---|---|---|
| 3,395,441 | 8/1968 | Herbenar | 29/441 |
| 3,395,442 | 8/1968 | Herbenar | 29/511 X |
| 3,430,327 | 3/1969 | Herbenar | 29/243.52 |
| 3,464,723 | 9/1969 | Herbenar | 287/87 |

Primary Examiner—Thomas H. Eager
Attorney—Gravely, Lieder & Woodruff

[57] ABSTRACT

A method especially suitable for assembling joint devices for use as mechanical connections, such as ball joints, tie rod ends or idler arms, so as to eliminate internal clearance between components due to manufacturing tolerances and for the purpose of obtaining substantially precise assembly control whereby defects such as jamming and lock-up of the movable components may be avoided. The method is put into practice by relatively simple tools which collectively constitute an improved apparatus to achieve superior results in the economy of assembling joint devices of the noted character.

7 Claims, 7 Drawing Figures

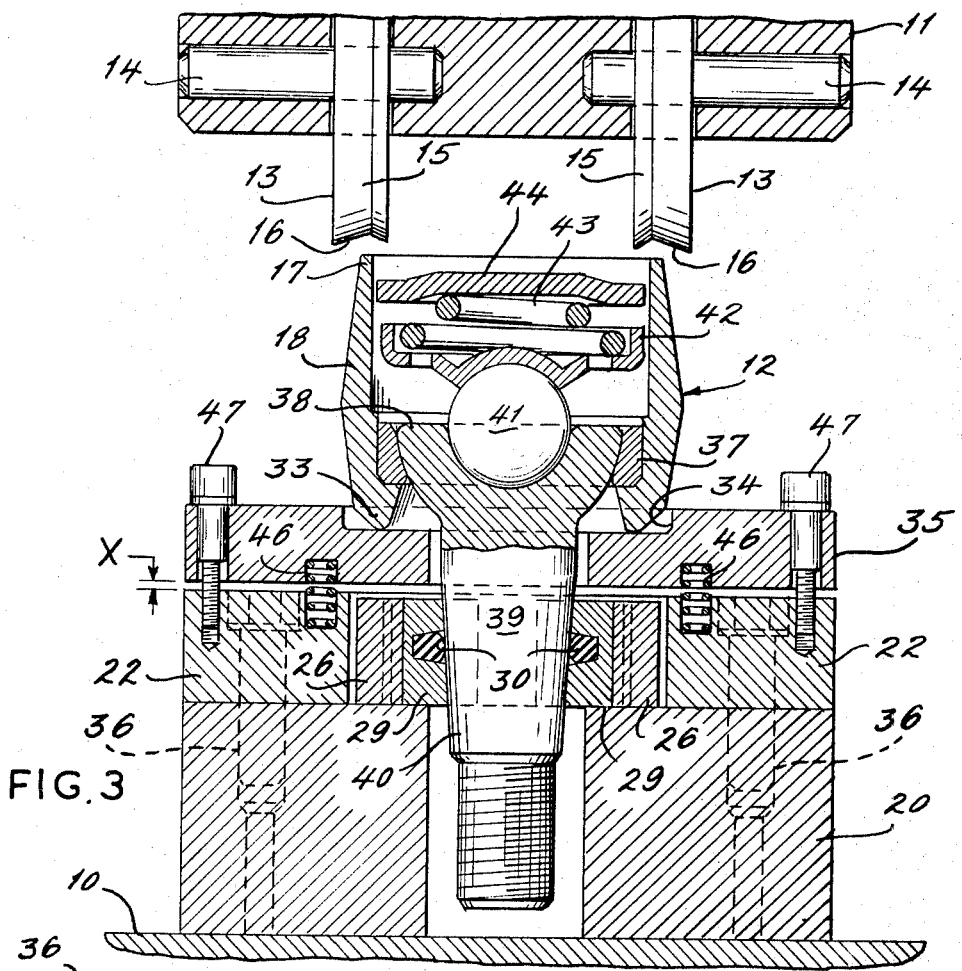
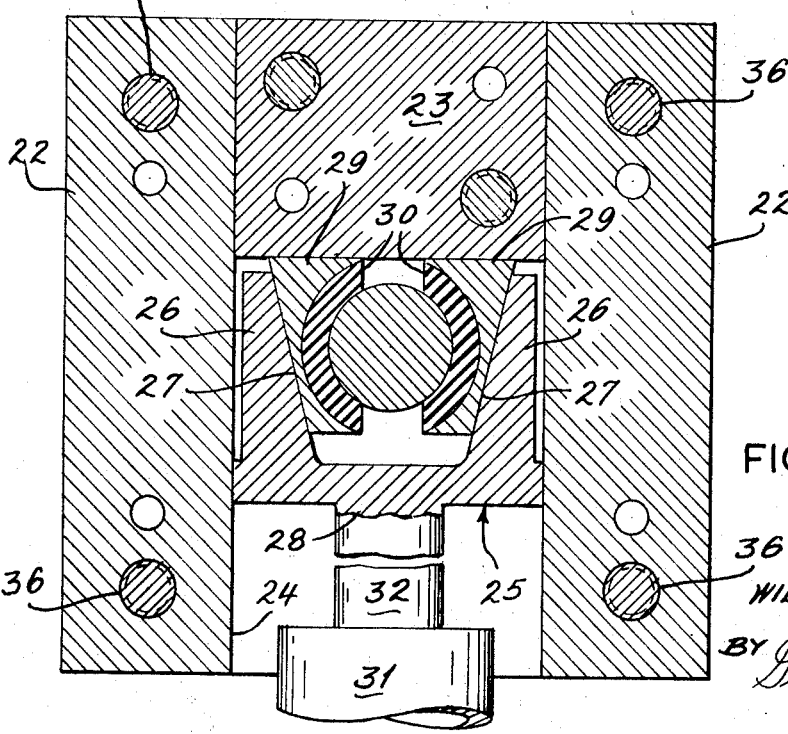

INVENTORS:
WILLIAM A. SCHEUBLEIN, JR.
LOUIS P. FISTER
BY Gravely, Lieder & Woodruff
ATTORNEYS.

3,656,221

METHOD OF ASSEMBLY OF JOINT DEVICES AND APPARATUS THEREFOR

This invention relates to a method of assembling the necessary components of any relevant joint devices, more especially joint devices useful in the automotive field, and it relates to improved apparatus for putting the method into practical use.

PROBLEMS IN THE ART

Heretofore, joint devices have been troubled with manufacturing tolerance build-up which has caused malfunctioning of the devices, such as jamming of the internal components, lack of precise initial adjustments so that some of the devices are too stiff while others are too loose, and rapid wear which reduces the service life of the devices. Elaborate and expensive tooling has been devised by some workers in this art to try to control tolerance factors, while others have tried to solve the various problems through design of the several components. Such efforts have generally increased costs and called for special skills in manufacturing procedures as well as in assembly techniques.

BRIEF OBJECTIVES OF THE INVENTION

The present invention is directed toward providing an unique method, practiced by simple apparatus, for reducing the cumulative effects of internal manufacturing tolerance factors so that substantial improvement can be obtained in achieving consistent results in the assembly of a variety of joint devices.

The invention is broadly directed to a method for assembling the components of a joint device which includes an open-ended housing, a load transmitting member extending into the housing, and means to secure the member in the housing in load transmitting relation thereto; said method comprising inserting the load transmitting member and securing means in the housing through the housing open end, supporting the housing opposite its open end independently of the load transmitting member, fixing the load transmitting member in a predetermined position relative to the housing, and thereafter spinning a flange around the open end of the housing adjacent the securing means to retain the components in operative assembly.

An important object of the invention is to control the working clearance between operating components within a joint device so that consistant and substantially uniform products may be turned out.

Another important object of the invention is to provide simple apparatus for supporting the components of the joint devices during assembly such that tolerances are automatically accounted for, whereby zero or a predetermined clearance of the working components can be selected.

Other objects of the invention, both as to method and apparatus, will be set forth in the following specification relating to certain preferred embodiments.

BRIEF DESCRIPTION OF DRAWINGS

The presently preferred embodiments of this invention are seen in the following drawings, wherein:

FIG. 2 is a transverse sectional view taken at line 2—2 of FIG. 1;

FIG. 3 is a partially sectional elevational view of another embodiment of apparatus by which the present invention may be practiced.

DESCRIPTION OF THE PREFERRED EMBODIMENTS

Figure 1:
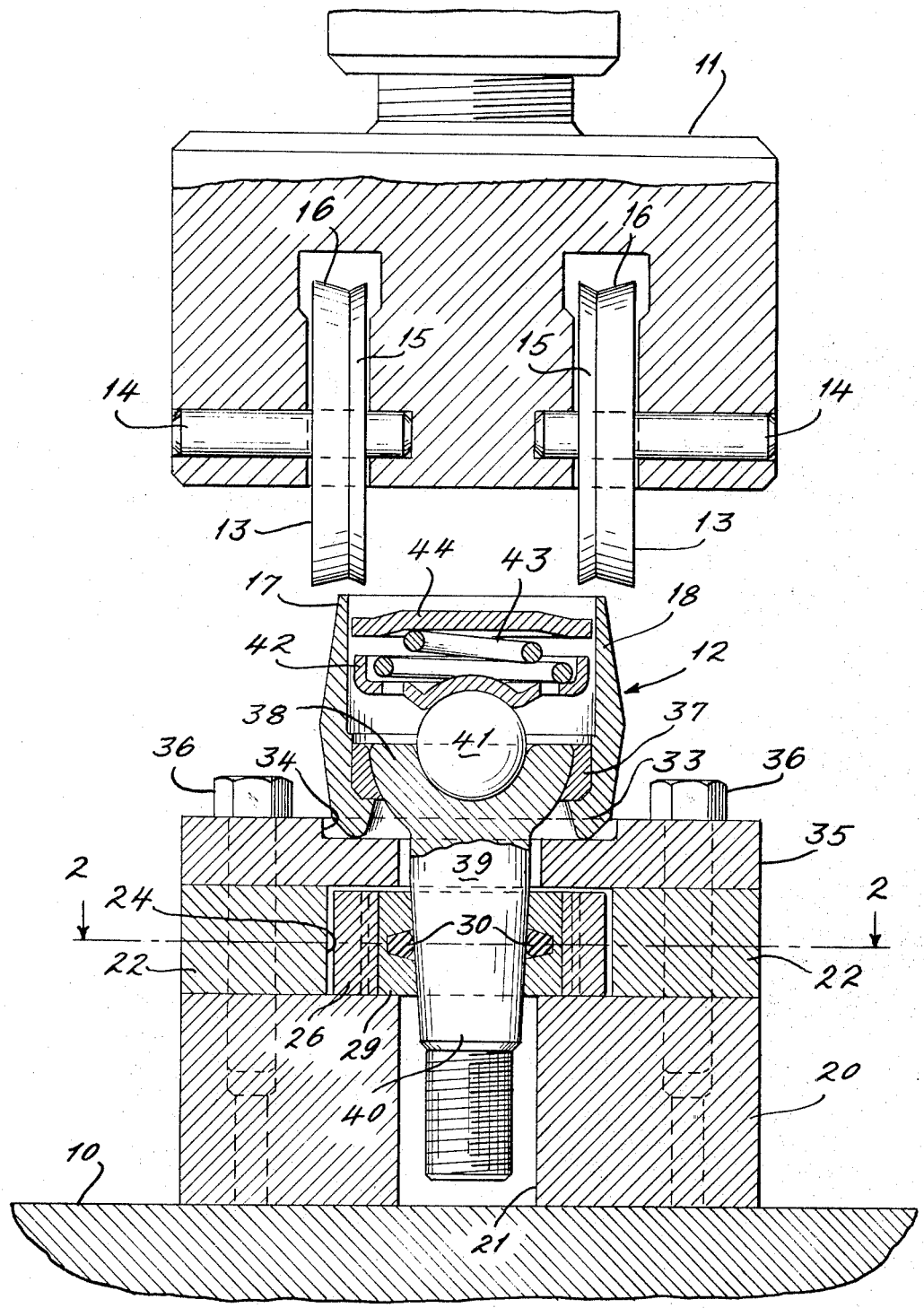
FIG. 1 is a partially sectional elevational view of one embodiment of apparatus by which the present invention may be practiced.

In FIG. 1 of the accompanying drawings, the apparatus includes a bed 10 for the spinning machine which may be of the usual construction. A spin-closure head 11 is suitable supported (not necessary to show) from the bed 10 so as to move in a vertical direction and concurrently allow the head to be rotated about the vertical center line of the housing for the joint device 12. Spinning rollers 13 (two being seen) are mounted in the head 11 on shafts 14 to rotate about the axes of shafts 14. The periphery of each roller 13 is formed with angularly related surfaces 15 and 16 which effect the inward flanging operation on the upwardly open lip 17 of the housing 18 for the device 12.

The bed 10 carries a fixture stand 20 of U-shape to form a central opening 21. The upper flat face of the stand 20 carries a pair of side abutments 22 and a rear abutment 23 (FIG. 2), thereby forming an elongated slot 24 above the central opening 21 for the reception of a force applying jaw member 25 having a pair of jaw elements 26 formed with angularly shaped inner faces 27 connected by a base element 28. A pair of spaced clamping wedges 29 abut the respective sloped faces 27 of the jaw member 25, and each wedge is provided with a semi-circular friction element 30. A suitable ram 31 is positioned on the bed 10 with its force applying rod 32 abutting the base element 28 of the jaw member for the purpose of forcing the jaw member 25 inwardly of the slot 24 to drive the wedges 29 toward each other and into gripping relation about the shank of a stud.

In FIG. 1, the joint device 12 is seen to include the open ended housing 18 placed in position with its opposite apertured flange bearing seat end 33 resting in the recess 34 of the top fixture plate 35. The plate 35 is firmly secured to the stand 20 by bolts 36 threaded into the stand 20 through the several abutment elements 22 and 23. The flanged end 33 of the housing 18 supports a suitable bearing 37 in which the headed end 38 of a load transmitting stud 39 is operatively seated. The shank 40 of the stud extends outwardly of the housing and downwardly into the opening 21 of stand 20 through the wedges 29 so that the wedges and the friction elements 30 thereon are in position to securely clamp the tapered portion of the shank and hold it against axial movement and turning upon actuation of the ram 31.

The upwardly open housing 18 receives other components of the ball joint assembly which, in this instance, include the ball element 41, a cup 42, a resilient preload element 43 and securing means as the closure plate 44.

The assembled elements in the housing 18 are positioned by gravity contact in the relationship shown in FIG. 1. Actuation of ram 31 will hold the stud shank 40 in relative fixed position and also against rotation, the actuating means being shown to advantage in FIG. 4. Upon axially downward feeding of the spinning head 11, the rollers 13 will engage the housing lip 17 and press its apertured bottom end 33 against the plate 35 in the recess or nest 34. The action of the spinning head rollers 13 will turn the housing lip 17 inwardly and force it against the closure plate 44. During this operation, the stud head 38, bearing ball 41, pressure cup 42, resilient element 43, and closure plate 44 will be forced into an interference contact with each other. However, no interference contact will occur between the stud head 38, the bearing 37 and the apertured end 33 of the housing 18, so that a zero clearance assembly is made without jamming the components. The zero clearance is obtained because the force exerted on the housing lip 17 is not transferred to any of the internal components of the assembly, but is taken through the housing wall to the nest 34. As a result of this method of closing the housing 18 at lip 17, the only load acting on the stud head 38 will be the load exerted by the preloading resilient element 43 as the housing lip 17 is turned inwardly to engage the closure element 44. That means that regardless of manufacturing tolerances of the internal components of the device 12, all devices 12 processed in this apparatus will have substantially the same stud torque and stud pull for a given force exerted by the resilient element 43. The assembled device 12 is released for removal upon retracting the ram rod 32 from the jaw member 25 and raising the spinning head 11. It is evident now that during closing operation of the spinning head 11 the stud shank 40 will not be allowed to change its position while a vertical force is exerted on the housing lip 17 by the rollers 13.

A second embodiment of apparatus is shown in FIG. 3 and wherever possible like parts will be identified by like reference numerals as applied in FIGS. 1 and 2. The difference here is that the top fixture plate 35 is supported by a plurality of resilient elements 46 so that it is spaced above the abutment elements 22 and 23 (FIG. 2). A plurality of adjusting screws 47 are slidable mounted in plate 35 and are threadedly connected in the elements 22 and 23. The resilient elements 46 raise the plate 35 a predetermined distance X above the elements 22 and 23, and this gap space may be set for any amount desired.

The difference between the apparatus of FIGS. 1 and 3 is that in FIG. 3 an adjustment is provided to allow for a predetermined amount of clearance within the assembled device 12 if required or deemed necessary. If, for example, a clearance of 0.010 inch is desired within the device 12, the plate 35 of FIG. 3 is adjusted by screws 47 until the distance X is 0.010 inch. Now when the spinning head 11 is axially advanced toward the housing lip 17, the housing 18 will be forced down and this will drive the plate 35 down to bottom out on the abutment elements 22 and 23. The result is that 0.010 inch of clearance will be produced between the stud head 38 and its bearing 37. It is, of course, evident that the stud shank 40 will be held by the clamping elements 29 and friction elements 30 in fixed position during the spinning over of the housing lip 17 on the closure plate 44.

Figure 4:
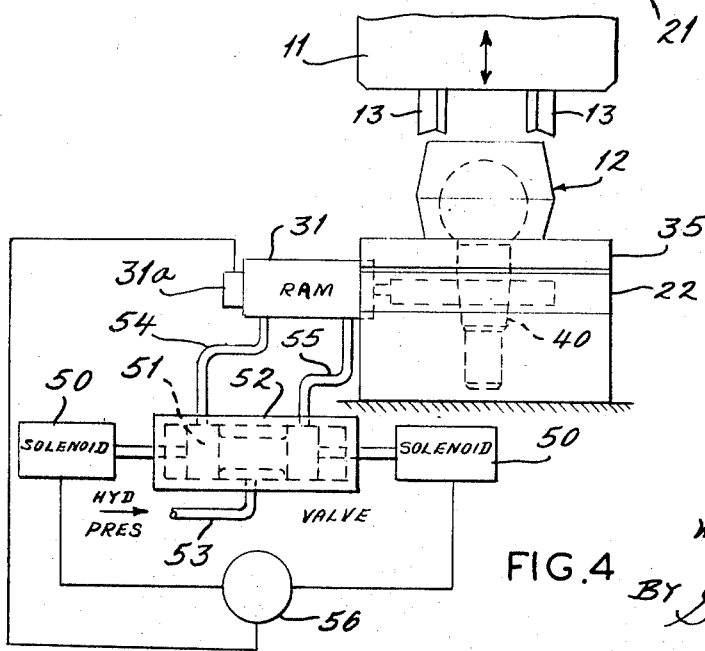
FIG. 4 is a schematic diagram of a suitable system for actuating the holding ram of the apparatus of FIG. 2.

As is schematically illustrated in FIG. 4, the ram 31 of FIG. 2 is controlled by solenoid motor means 50 operably connected to a spool valve 51 in a control member 52 inserted between a fluid pressure supply conduit 53 and the pair of distribution conduits 54 and 55 connected to opposite ends of the ram 31. The solenoid motor means 50 are subject to the control of a suitable electric control means 56 which is triggered upon initial downward motion of the spinning head 11. This triggering action energizes solenoid motor means 50 to feed the ram 31 for clamping the stud shank. A pressure sensor device 31A on the ram reacts when the desired clamping pressure is reached to feed back to the control 56 a signal to set the control member 52 to close both the pressure and return lines to the ram 31. This traps the fluid and holds the ram 31 in its shank gripping position with sufficient force to fix the shank position.

The apparatus and the method connected therewith as described for FIGS. 1, 2 and 3 applies generally to joint devices which are installed in usage under tension loads, that is, the principal forces are directed to cause the stud to bear upon the bearing seat element 37, while rebound forces are small by comparison and are opposed by the resilient element 43. As will appear below the apparatus and its method of operation can be applied to the assembly of compression loaded joint devices with equally good results, taking into consideration modifications to suit the different direction of applied loads and the repositioning of the internal components of the devices. Wherever possible like reference characters as are used in FIGS. 1 to 4 will be used in describing the elements, components and members which appear in the several views of FIGS. 5 to 7.

Figure 5:
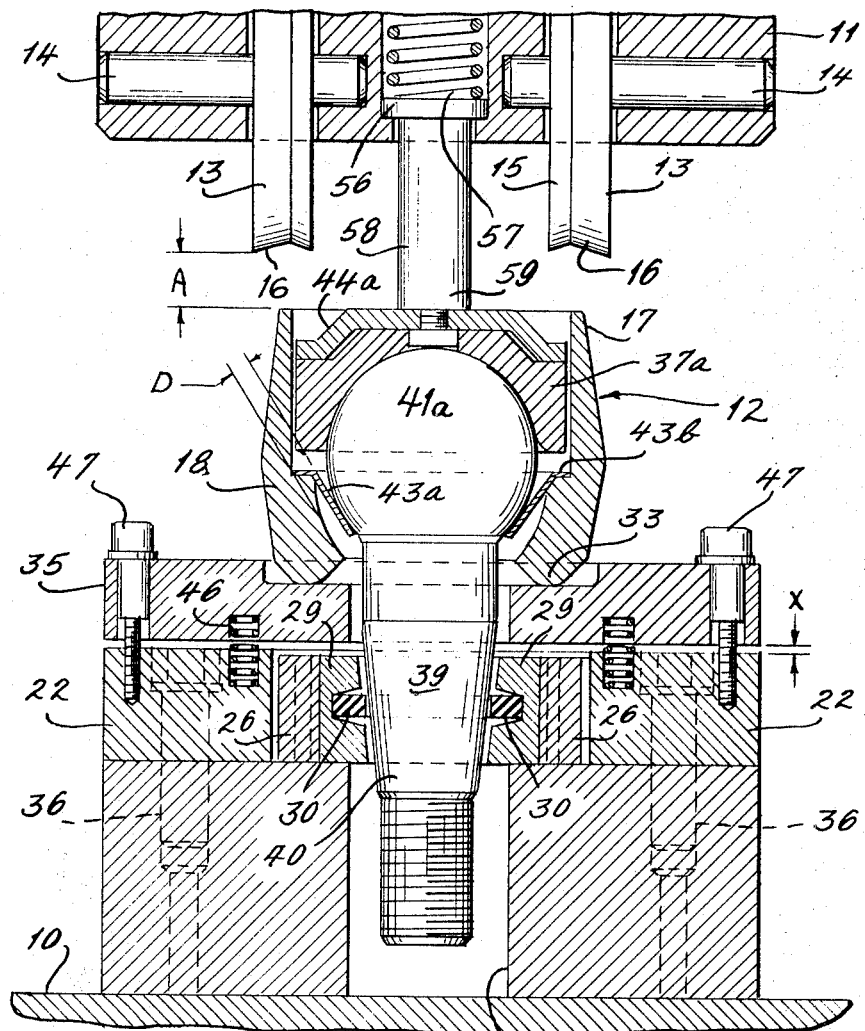
FIG. 5 is a partially sectional elevational view of still another embodiment of apparatus by which the present invention may be practiced.
Figure 6:
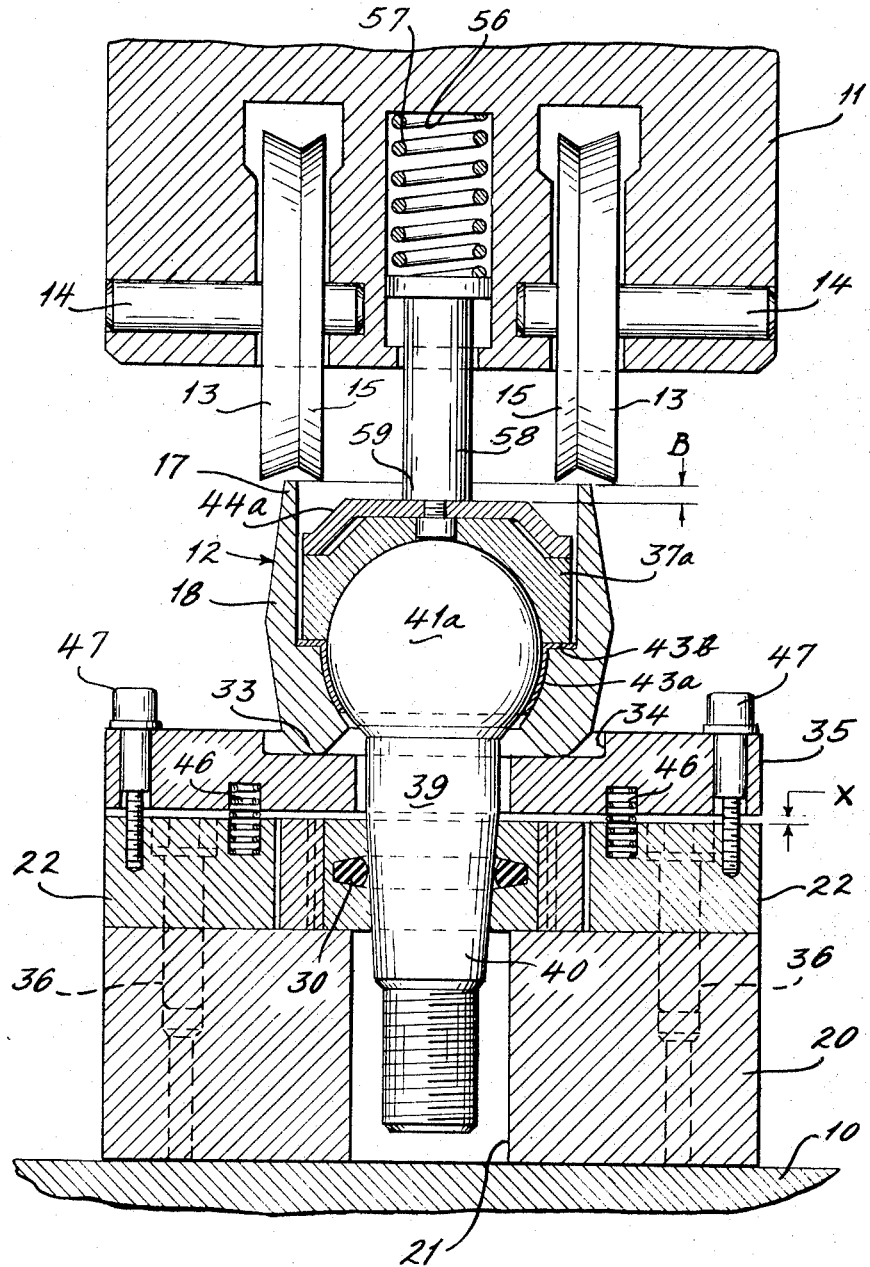
FIG. 6 is a view similar to FIG. 5, but illustrating a different stage in operation of the apparatus.

FIGS. 5 and 6 illustrate different stages of operation of an embodiment of apparatus useful for practicing the present method of this invention as applied to compression loaded joint devices. Reference will first be directed to FIG. 5, but similar reference characters will apply to FIG. 6 as well.

In FIG. 5 the housing 18 has its open end upward with the lip 17 directed to be engaged by the flanging rollers 13 and its bottom end 33 seated in the nest or recess 34 of the plate 35 resiliently spaced from the elements 22 and 23 by springs 46 by a predetermined clearance distance X (as seen in FIG. 3). A stud 39 has its spherical head end 41a located in the housing against resilient finger means 43a which extend inwardly from a rim 43b. There are a plurality of these resilient finger means 43a which serve the same function as the resilient means 43 in FIG. 3. The stud head 41a is initially spaced a distance D from the bottom surface of the housing. A bearing seat element 37a is placed over the stud head 41a, and a closure plate 44a is disposed on the element 37a inwardly of the housing lip 17.

The spinning head 11 is varied from the one shown in FIGS. 1 and 3 by having a socket 56 formed centrally therein to receive a resilient member 57. The member 57 bears down on a plunger 58 to extend the plunger below the rollers 13 whereby its outer end 59 may engage the closure plate 44a prior to the head 11 advancing the rollers 13 into engagement with the housing lip 17. In this apparatus, it is to be noted, the force of resilient member 57 is greater than the force of the resilient fingers 43a, and the resilient springs 46 exert a force on plate 35 greater than the resilient member 57.

Turning now to FIG. 6, the operation of the apparatus will be described and compared with FIG. 5. After the components of the joint have been assembled in housing 18, and with the fingers 43a suspending the stud head 41a the distance D above the bottom end 33, and the gripping means 30 free of the stud shank 40, the head 11 is advanced until the plunger 58 has its ends 59 just engaging the closure plate 44a. At this point in the advance of the head 11, the spinning rollers 13 are spaced a distance A above the top of the closure plate 44a. As the head 11 continues to lower the plunger 58 forces the closure plate 44a, bearing 37a and stud head 41a down compressing the resilient fingers 43a until the distance D is closed and the fingers 43a bottom in the housing 18. When this point is reached the rollers 13 will still be spaced above the top of the closure plate 44a a distance B and the rollers 13 will be very near the housing lip 17. Concurrently, the plunger 58 will have receded into the socket 56 of the head due to the bottoming out of the resilient fingers 43a so that the solid engagement of the stud head 41a will overcome the force of the resilient member 57 in the socket 46. This action of the parts is evident since the resilient member 57 exerts greater downward force on the plunger 58 than the upward lift of the resilient fingers 43a on the stud head 41a. Thus, there will be no vertical clearance within the assembly in the housing 18.

At the condition illustrated in FIG. 6, the head 11 will trigger the ram 31 of FIG. 4 to clamp the stud shank 40 so the stud head 41a is fixed against further vertical movement, and the plunger must thereafter recede further into the socket 56. At this point, if the predetermined clearance X is not desired, the plate 35 will have been adjusted by threaded means 47 so that the distance X is zero. In the drawing, it is seen that the clearance distance X is present however. In other words, a clearance within the joint may or may not be desired.

Further downward travel of head 11 (FIG. 6) will now begin the spinning operation on lip 17. Thus a solid connection is established by the rollers 13 through the housing 18 upon the plate 35 in the nest or recess 34 and the plate 35 will now move down as the resilient springs 46 yield. The yielding reaction of springs 46 will transfer the clearance distance X which has been preselected into the joint and the fingers 43b will be relieved from their bottom-out condition. The spinning rolls turn the lip 17 over the closure plate 44a to lock the components in the housing.

In the method of assembly shown in FIG. 3 for a tension loaded joint the stud shank is always directed down in the block 20, the internal resilient means 43 of the joint is always above or on top of the stud head 41 adjacent the spinning lip 17, and the stud shank 40 is always clamped early in the downward stroke of the head 11 so that its vertical movement is prevented. The compression loaded joint (FIGS. 5 and 6)

has the internal resilient means 43a on the same side of the stud head 41a with the shank 40 and the bearing 37a is now adjacent the spinning lip 17. The assembly method is, therefore, altered to accommodate these differences which can be noted in that for the joint of FIGS. 5 and 6 when a predetermined final clearance is wanted the stud head 41a must be allowed to move vertically juat before it is clamped and rendered immobile.

Figure 7:
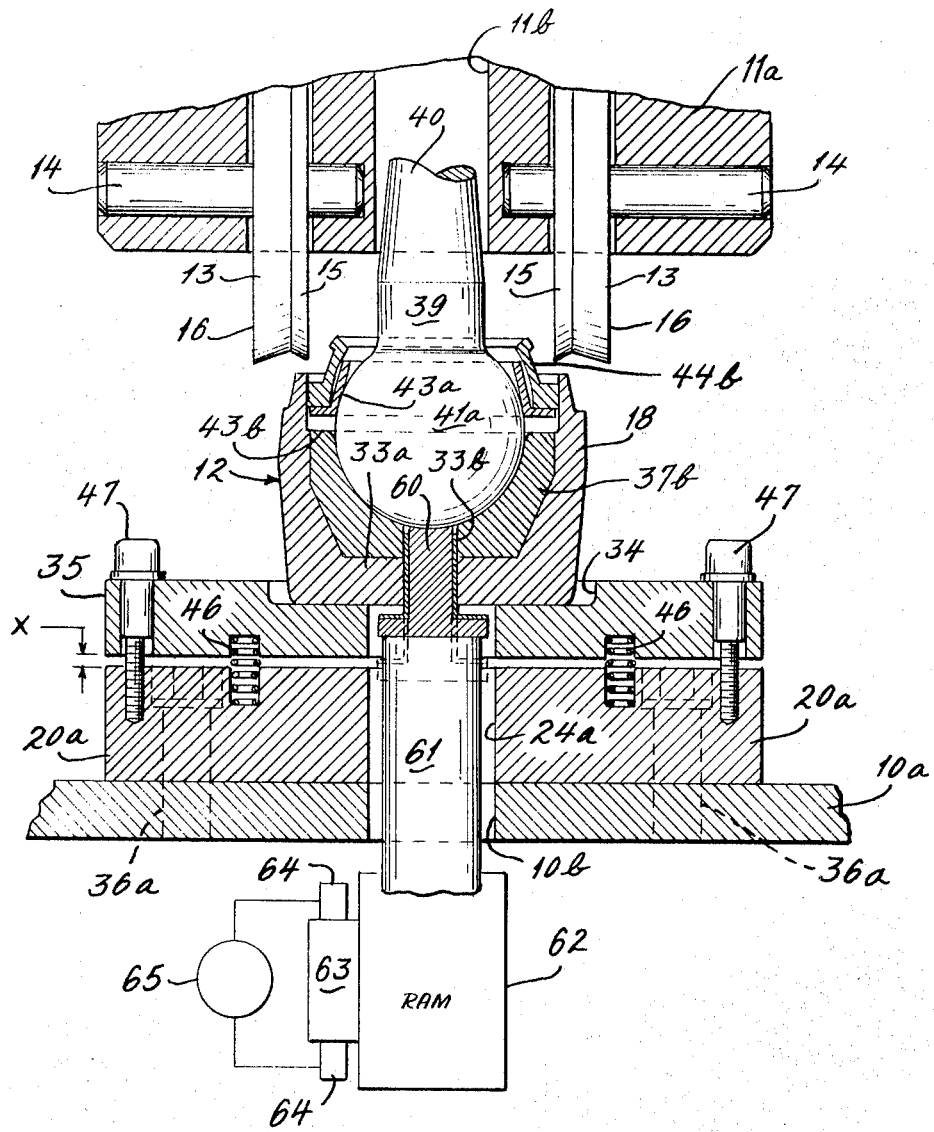
FIG. 7 is a partially sectional elevational view of yet another apparatus suitable for carrying out the present invention.

Another type of compression loaded joint is shown in FIG. 7 where the bearing is under the stud head and the internal resilient means and closure plate are adjacent the spinning lip on top of the stud head. In this view, similar reference characters will be applied wherever possible as in FIG. 5.

In FIG. 7 the spinning head 11a is varied from FIG. 1 in that a central aperture 11b is provided to loosely receive the upward directed shank 40 of the stud 39. The bed is also varied in that a central aperture 10b is provided, and the fixture stand 20a is secured thereto by means 36a so that its slot 24a is aligned with the aperture 10b. The fixture plate 35 is adjustably mounted on springs 46 by means 47 on the stand 20a, as before, with its nest or recess 34 uppermost to receive the end 33a of housing 18 with the aperture 33b therein aligned with apertures 24a and 10b. The joint housing 18 has its open spinning lip 17 set upwardly toward the spinning head 11a. The bearing seat 37b is disposed in the housing and the stud 39 is placed with its spherical head 41a in the seat 37b. The resilient member (similar in form to that of FIG. 5) has its rim 43b facing to the bearing 37a with its fingers 43a uppermost, and a closure 44b is placed over the resilient fingers 43a, all as shown. The stud shank 40 now extends upwardly into the central aperture 11b of the head 11a.

A stud head positioner member 60 extends up from the under side of plate 35 through the housing aperture 33b and is supported by a plunger 61 of the ram 62. The ram 62 has a suitable control valve 63 operated by solenoids 64 through an electric controller 65 which is responsive to the position of the spinning head 11a.

In operation, the controller 65 is triggered by the initial downward movement of head 11a to lift the positioner member 60 up until it contacts and engages the stud head 41a, whereupon the controller 65 will set the control valve so that the ram 62 will become locked against further movement. Suitable circuit connections are provided through the positioner 60 being electrically insulated from the surrounding parts of the fixture so that when contact is made on the stud head 41a and the rollers 13 just contact the housing lip 17a, a circuit (not shown) is completed to the controller 65 to effect the locking of the ram 62. The stud head 41a now cannot move down, so the spinning rollers 13 will begin the lip flanging operation and push the housing 18 down to force the plate 35 down to close the clearance distance X by causing the springs 46 to yield. The clearance X which is predetermined by threaded means 47 will be transferred to the resilient fingers 43a. Of course, when zero clearance within the joint is desired the gap distance X will be zero as before explained. The lip 17 will be spun inwardly over the closure means 44b to fix the assembly.

In the tension loaded joints of FIGS. 1 and 3, or the compression loaded joints of FIGS. 5, 6 and 7, the apparatus will effect consistant and exact dimensional control over the assembly without regard to tolerance between the several components because the actual spinning force is always taken through the wall of the housing 18 upon the plate 35. Desired internal clearance is achieved in the manner seen in FIGS. 3, 5, 5 and 7, because the stud stands at a fixed position and the housing moves relative thereto by the amount of the distance X.

It is now seen that the apparatus above described achieves the objects of the novel and unique method for assembling joint devices of a broad range of purposes and for both tension and compression loading uses. Changes and variations may be made herein from the several views showing presently preferred embodiments of apparatus, such as variations in clamping the stud shank by mechanical or other means.

What is claimed is:

1. A method for assembling the components of a joint device which includes an open-ended housing, a load transmitting member extending into the housing, and housing closure means to secure the member in the housing in load transmitting relation thereto; said method consisting in locating the housing on a support in position to receive the load transmitting member, placing the load transmitting member in the housing, swaging a flange about the open end of the housing in overlapped relation to the closure means to hold the closure means and load transmitting member in the housing, and supporting the load transmitting member in a fixed position independent of the housing and its support during the swaging of the flange.

2. A method for assembling the components of a joint device which includes an open-ended housing, a load transmitting member extending into the housing, and housing closure means to secure the member in the housing in load transmitting relation thereto; said method consisting in locating the housing on a support in position to receive the load transmitting member, placing the load transmitting member in the housing, swaging a flange about the open end of the housing in overlapped relation to the closure means to hold the closure means and load transmitting member in the housing, and fixing the load transmitting member against rotational and linear movement independent of the housing and its support during the swaging of the flange.

3. A method for assembling the components of a joint device which includes an open-ended housing, a load transmitting member extending into the housing, and housing closure means to secure the member in the housing in load transmitting relation thereto; said method consisting in locating the housing on a support in position to receive the load transmitting member, placing the load transmitting member in the housing, swaging a flange about the open end of the housing in overlapped relation to the closure means to hold the closure means and load transmitting member in the housing, and supporting the load transmitting member independently of the housing and against axial displacement relative to the housing and its support during the swaging of the flange.

4. A method for assembling the components of a joint device which comprises an open-ended housing, a load transmitting member having a headed end in the housing and a shank extending therefrom, pre-load means, and housing closure means to retain the headed end and preload means in the housing; said method consisting in supporting the housing for predetermined limited axial displacement relative to the extended shank, placing the headed end in the housing with the shank extended therefrom, supporting the headed end in the housing against movement by engaging the shank, and spinning a swaging tool around the housing while advancing the tool axially of the housing and maintaining the radius of revolution of the tool constant to form a flange overlapping the closure means.

5. A method for assembling the components of a joint device which components consist of a housing having opposite open ends, a load transmitting member having a headed end in the housing and a shank extending from one open end, pre-load means, and housing closure means to retain the headed end and pre-load means in the housing; said method including supporting the housing from the one open end for predetermined limited displacement axially of the extended shank, supporting the headed end of the load transmitting member independently of and in a predetermined position relative to the housing, advancing a flanging head against the other open end of the housing to form a flange thereon adjacent the housing closure means, and flanging the other open end of the housing upon completion of its limited axial displacement to provide clearance in the joint device between the housing and headed end of the load transmitting member substantially equivalent to said limited axial displacement of the housing support.

6. A method for assembling the components of a joint device which comprises setting the headed end of the load transmitting member in the housing for engagement under its own weight and fixing the position of the member relative to the housing at this engagement, positioning a closure means adjacent the headed end and in the housing, spinning a swaging tool around the housing while advancing the tool axially of the housing and maintaining the radius of revolution of the tool constant to form a flange on the housing overlapping the closure means, and supporting the housing independently of the headed end of the load transmitting member to cooperate with the axial advance of the swaging tool in the forming of the flange on the housing overlapping the closure means.

7. The method set forth in claim 6 which includes allowing the support for the housing a predetermined limited displacement axially with the swaging tool, the axial advance of the tool displacing the housing relative to the headed end to provide clearance in the joint device substantially equivalent to the limited axial displacement of the housing support.

* * * * *